United States Patent
Monteil et al.

(10) Patent No.: US 9,593,787 B2
(45) Date of Patent: *Mar. 14, 2017

(54) SECURED IN PLACE GASKET FOR SEALING PLASTIC PIPELINES, METHOD OF MANUFACTURE AND METHOD OF INSTALLATION

(71) Applicant: S & B Technical Products, Inc., Fort Worth, TX (US)

(72) Inventors: Guillermo Monteil, San Jose (CR); Keith Steinbruck, Eugene, OR (US)

(73) Assignee: S & B Technical Products, Inc., Fort Worth ( * ) Notice: Subject to any disclaimer, the term of this patent is extended or adjusted under 35 U.S.C. 154(b) by 119 days.

This patent is subject to a terminal disclaimer.

(21) Appl. No.: 13/952,779

(22) Filed: Jul. 29, 2013

(65) Prior Publication Data

US 2014/0374995 A1   Dec. 25, 2014

Related U.S. Application Data

(63) Continuation-in-part of application No. 13/923,468, filed on Jun. 21, 2013.

(51) Int. Cl.
*F16L 21/03* (2006.01)
*B29C 45/00* (2006.01)
(Continued)

(52) U.S. Cl.
CPC .......... *F16L 21/03* (2013.01); *B29C 45/0001* (2013.01); *B29C 45/14008* (2013.01); *B29C 45/1459* (2013.01); *B29C 45/14819* (2013.01);

*F16J 15/104* (2013.01); *F16J 15/166* (2013.01); *F16L 17/035* (2013.01); *F16L 37/0845* (2013.01); *F16L 37/091* (2013.01);
(Continued)

(58) Field of Classification Search
CPC ........ F16J 15/14; F16J 15/0887; F16J 15/061; F16L 17/02; F16L 17/00
See application file for complete search history.

(56) References Cited

U.S. PATENT DOCUMENTS 4,693,483 A   9/1987   Valls
4,818,209 A   4/1989   Petersson et al.
(Continued)

OTHER PUBLICATIONS

PCT International Patent Application No. PCT/US14/37493, Search Report and Written Opinion dated Nov. 13, 2014, 12 pages.
(Continued)

*Primary Examiner* — Vishal Patel
(74) *Attorney, Agent, or Firm* — Whitaker Chalk Swindle & Schwartz PLLC; Charles Gunter

(57) ABSTRACT

A pipe sealing gasket is shown which is designed to be received within a raceway provided within a socket end of a female bell plastic pipe end which is assembled with a mating male pipe end to form a plastic pipe joint. The raceway is preformed about the gasket during the pipe belling operation. The gasket has a rubber body portion which is reinforced by a hard plastic band formed as a series of integral, spaced wedges which are interconnected by a flexible ribbon. The hard plastic band acts to prevent extrusion of the gasket during a variety of pressure conditions as well as preventing displacement during field assembly.

5 Claims, 13 Drawing Sheets

(51) Int. Cl.

| | | |
|---|---|---|
| *B29C 45/14* | (2006.01) | |
| *F16J 15/10* | (2006.01) | |
| *F16J 15/16* | (2006.01) | |
| *F16L 17/035* | (2006.01) | |
| *F16L 37/084* | (2006.01) | |
| *F16L 37/091* | (2006.01) | |
| *F16L 47/08* | (2006.01) | |
| *B29K 701/12* | (2006.01) | |
| *B29L 31/26* | (2006.01) | |
| *B29K 21/00* | (2006.01) | |

(52) U.S. Cl.
CPC ......... *F16L 47/08* (2013.01); *B29C 45/14311* (2013.01); *B29C 45/14631* (2013.01); *B29K 2021/00* (2013.01); *B29K 2701/12* (2013.01); *B29L 2031/265* (2013.01)

(56) References Cited

U.S. PATENT DOCUMENTS

| | | | |
|---|---|---|---|
| 4,834,398 A | 5/1989 | Guzowski et al. | |
| 4,834,430 A | 5/1989 | Vassallo et al. | |
| 5,213,339 A | 5/1993 | Walworth | |
| 5,334,458 A * | 8/1994 | Powers et al. | 428/517 |
| 5,988,695 A | 11/1999 | Corbett, Jr. | |
| 6,113,159 A * | 9/2000 | Corbett, Jr. | 285/345 |
| 6,142,484 A | 11/2000 | Valls, Jr. | |
| 6,152,494 A * | 11/2000 | Corbett et al. | 285/110 |
| 6,299,176 B1 * | 10/2001 | Guzowski et al. | 277/604 |
| 6,328,309 B1 | 12/2001 | Corbett, Jr. | |
| 6,676,886 B2 | 1/2004 | Corbett, Jr. | |
| 6,945,570 B2 | 9/2005 | Jones | |
| 7,731,884 B2 | 6/2010 | Knapp et al. | |
| 7,837,239 B2 | 11/2010 | Krausz et al. | |
| 8,074,996 B2 * | 12/2011 | Darce et al. | 277/314 |
| 2006/0175765 A1 | 8/2006 | Happel | |
| 2008/0007062 A1 * | 1/2008 | Jones et al. | 285/374 |

OTHER PUBLICATIONS

Trelleborg, Forsheda 601. Power-Lock™, product pages, 2 pages, © 2001 www.Trelleborg.com/pipeseal.

Trelleborg, Forsheda 576, Anger-Lock™, product pages, 2 pages, © 2001 www.Trelleborg.com/pipeseal.

Shah Rahman et al., "PVC Pipe Joining: The Rieber System in North America", 10 pages, 2007.

* cited by examiner

SECURED IN PLACE GASKET FOR SEALING PLASTIC PIPELINES, METHOD OF MANUFACTURE AND METHOD OF INSTALLATION

CROSS REFERENCE TO RELATED APPLICATIONS

The present application is a continuation-in-part of earlier filed Ser. No. 13/923,468, filed Jun. 21, 2013, entitled "Secured in Place Gasket for Sealing Plastic Pipelines, Method of Manufacture and Method of Installation", by Guillermo Monteil.

BACKGROUND OF THE INVENTION

Field of the Invention:

The present invention relates generally to sealing gaskets and sealing systems used for pipe joints in plastic pipelines, such as municipal water and sewer lines, in which a male spigot pipe section is installed within a mating female socket pipe section to form a pipe joint.

Description of the Prior Art:

Fluid sealing systems for plastic, fluid conveying pipes are used in a variety of industries. The pipes used in such systems are typically formed from thermoplastic materials including polyolefins and PVC. In forming a joint between sections of pipe, the spigot or male pipe end is inserted within the female or socket pipe end. An annular, elastomeric ring or gasket is typically seated within a raceway or groove formed in the socket end of the thermoplastic pipe. As the spigot is inserted within the socket, the gasket provides the major seal capacity for the joint. Various types of sealing technologies have been employed to assure the sealing integrity of the pipe joint. It is important that the sealing gasket not be dislodged during the joint make up and that the gasket not become twisted or otherwise compromised in field applications. It is also important that the gasket not extrude out of the pipe groove under various pressure conditions.

Earlier gasketed sealing systems are known in which a homogeneous rubber gasket was generally deformable, allowing it to be flexed or bent by hand, accepting inverse curvature, and inserted within a mating internal raceway formed in the female, belled pipe end. The raceway in the female pipe bell end was pre-formed using a collapsible mandrel belling tool at the pipe manufacturing facility. Due to the elastic nature of rubber these gaskets will extrude through the annular space created by the male pipe spigot end and female lip of the bell under cyclic and high pressure conditions. These gaskets also proved to be relatively easy to displace during field assembly of the joint. A prior art attempt to prevent gasket extrusion of such pipe joints involved the use of a pipe gasket having a first distinct body region formed of an elastically yieldable sealing material, such as rubber, bonded to a second distinct body region formed of a more rigid material, such as a rigid plastic. The intent was that the rigid body region of the gasket would assist in holding the gasket in place within the pipe groove. Other approaches to the problem included the use of a homogeneous rubber ring with a discrete stiffening band which was inserted into a groove provided on the internal diameter of the rubber ring. In the other prior art systems, a homogeneous rubber gasket body was bonded with an internal or external metal, or plastic, reinforcing band or an internal metal band or ring. Each of these solutions had critical limitations. For example, the internal metal reinforcing band must be treated properly for metal bonding, coated to prevent rusting, and situated precisely inside the mold using a series of pins. The prior art plastic/rubber composites sometimes allowed the infiltration of dirt and debris between the bell raceway and the outer diameter of the gasket. The plastic region in some cases, reduced the rubber surface contact area, sometimes leading to problems in providing the needed sealing in all conditions, including high pressure, low pressure and cyclic surges. Compatible materials were necessary when bonding the homogeneous rubber gasket body with the plastic reinforcing band. Poor bonding resulted in separation of the two elements. The reinforcing band was subject to being misplaced and breakage in the two part system. Thus, in some cases, the prior art solutions failed to provide the needed joint integrity, often contributing to the complexity and expense of the manufacturing operation and field installation.

In the early 1970's, a new technology was developed by Rieber & Son of Bergen, Norway, referred to in the industry as the "Rieber Joint." The Rieber system employed a combined mould element and sealing ring for sealing a joint between the socket end and spigot end of two cooperating pipes formed from thermoplastic materials. In the Rieber process, an elastomeric gasket was installed within an internal raceway or groove in the socket end of the female pipe as the female or belled end was simultaneously being formed. Rather than utilizing a preformed groove, the Rieber process provided a prestressed and anchored elastomeric gasket during the belling operation. The Reiber gasket has a homogeneous gasket body bonded to an internal or external metal wire or band, the band preventing rubber deformation, thus allowing a heated and softened pipe end to be pushed over the gasket. Because the gasket was installed simultaneously with the formation of the belled pipe end, a rigid, embedded reinforcing ring could be supplied as a part of the gasket. Because the pipe groove or raceway was, in a sense, "belled over" and formed around the gasket with its embedded reinforcing ring, the gasket was securely retained in position and did not tend to twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682.

Despite the advances offered by the Rieber process, there were some situations in which the "belled over" gasket design could be a disadvantage. For example, certain situations exist in which it would be desirable to manually remove one gasket and reinstall another within a preformed raceway in the selected pipe end, rather than utilizing an integrally installed gasket in which the groove in the pipe is formed around the gasket. For example, municipal and consulting engineers will specify specialty elastomers based on the pipelines end-use and soil conditions. While SBR is the most common rubber used in North America, engineers will specify EPDM based on water treatment technique, and nitrile rubber when there is hydrocarbon soil contamination due to gasoline or oil pollution. Distributors and contractors cannot exchange Rieber process gaskets in their pipe inventory.

The prior art Rieber manufacturing process necessarily requires a pipe company to hold inventory to make a production run of gasketed pipe. Without prior art Rieber gaskets on-hand, pipe cannot be produced. It would be advantageous to be able to place a specially designed gasket on a belling mandrel, use the gasket as a raceway forming device, form a bell and raceway, and then remove the gasket from inside the bell. The gasket could then be placed on the belling mandrel again to form an additional pipe. Pipe could be produced and sent into inventory and gaskets installed into the bell raceways at a later date.

The gaskets used in the prior art Rieber process were typically injection molded with a wire or band embedded in the rubber to hold the gasket dimensions and make subsequent Rieber belling process possible. The steel wire, or band, must be treated to assure rubber-to-metal bonding, and coated to inhibit oxidation and corrosion. The wire or band was held in place with small pins. As gaskets are designed having very small cross sections, a wire is used, and the wire itself is very small in cross section. It becomes difficult to hold the wire in position and the small pins become susceptible to damage. It would thus be of an advantage to be able to use a specially designed gasket which would not require the use of pins in the gasket molding process. The elimination of the mold pins reduces mold maintenance cost and allows for production of Rieber belled pipe of reduced cross sections not previously possible.

It would therefore be advantageous to be able to install a gasket of the type having a reinforcing element within a previously belled pipe end, as opposed to those systems like the Rieber systems, where the female pipe end is formed about the sealing gasket during the manufacture of the female pipe end. However, prior art gaskets with reinforcing elements are subject to breakage and are not easily bent or flexed by hand, thus generally precluding hand assembly in the field.

It would also be advantageous to provide a gasket and manufacturing process that would use the Rieber "belled over" gasket manufacturing process, but which would also allow the gasket to be removed by hand if desired. Many pipe companies exclusively utilize the "belied over" Rieber process, eliminating their ability to sell pipe having "exchangeable gaskets."

U.S. Pat. No. 6,044,539, issued Apr. 4, 2000, to Guzowski, and commonly owned by the present applicant describes a machine for inserting a "snap-fit" gasket, unable to accept inverse curvature, having an embedded reinforcing ring into a preformed gasket receiving groove in a belled pipe end. However, such a machine was fairly costly to construct and presented difficulties in being hand carried by a worker in the field. Once installed this gasket is very difficult to remove without damage to the embedded ring.

The present invention has, as one object, to provide an improved pipe gasket for use in pipe joints which offers the advantage of the "belled over" Rieber process, while allowing the gasket to accept inverse curvature, to be installed in a preformed groove by hand, either at the manufacturing plant or in a field operation.

An alternative object of the invention is to provide a gasket for use in pipe joints which offers the advantage of the Rieber style manufacturing process and yet which can be removed by hand, if desired.

Another object of the invention is to provide an improved gasket which is securely retained within a preformed pipe groove without the necessity of a treated, coated and bonded metal retaining band.

Another object of the invention is to provide an improved sealing gasket of the plastic/rubber variety which optimizes the rubber sealing surface contact of the gasket with the pipe bell raceway.

Another object of the invention is to provide a reinforcing element that is not required to be bonded to the rubber element, hence creating the possibility of being made from a multitude of plastic materials.

Another object of the invention is to extend the "belled over" Rieber process to a small diameter, and small gasket cross sections than currently possible.

Another object of the invention is to provide such a sealing gasket with special reinforcing attributes which allow it to seal under a variety of pressure conditions without being twisted or extruded, or displaced during field assembly.

SUMMARY OF THE INVENTION

In one version, the sealing gasket of the invention is a rubber/plastic secured-in design which is especially useful in sealing PVC pipes having bell ends with preformed raceways made using collapsible mandrel tools. This version is particularly useful for molecularly oriented PVC pipe (PVC-O) due to the fact such pipes cannot be "belled over" using the Rieber process. The gasket is reinforced with a reinforcing element, or band, comprised of a series of wedges which are interconnected by a flexible ribbon. The band is preferably imbedded within the rubber body portion of the gasket, avoiding the use of bonding elements. The rubber element of the gasket provides the primary sealing capacity while the plastic element improves resistance to extrusion due to water pressure and displacement during field assembly.

The gasket accepts inverse curvature to allow easy installation in a pre-formed pipe bell raceway by hand. Once the gasket is installed, it works as a combined compression and lip seal. It is preferably installed by the PVC pipe manufacturer and, once installed, is a secured part of the pipe. The rubber portion of the gasket can be, for example, SBR, EPDM, NR, etc., combined with a hard plastic band.

In its preferred form, a first version of a pipe sealing gasket is shown which is designed for receipt within a groove provided within a female socket end of a thermoplastic pipe, the female socket end being designed to receive a mating male thermoplastic pipe end to form a pipe joint. The gasket comprises a ring shaped elastomeric body having a main body portion formed of rubber which, when viewed in cross section, includes a leading nose region, a lower compression region and a trailing tail region. The leading nose region faces generally towards the female socket end of the pipe once the gasket is inserted within the pipe.

The leading nose region of the main body portion of the gasket is reinforced by a hard plastic band comprised of a series of wedges interconnected by a flexible ribbon, the hard plastic band being embedded within the leading nose region of the main body portion of the gasket during gasket manufacture. In use, the wedges spaced along the ribbon act to prevent extrusion and displacement of the gasket from the raceway provided in the female socket end of the thermoplastic pipe. The main body portion of the gasket can conveniently be formed of a natural or synthetic rubber, for example, styrene butadiene rubber, ethylene propylene diene monomer rubber and nitrile rubber. The hard plastic ribbon is formed of a synthetic plastic material having a durometer which is greater than the durometer of the main body portion of the gasket. The material is selected based upon its having sufficient rigidity to prevent extrusion and displacement in use, while being flexible enough to allow the gasket to accept inverse curvature during installation. The material chosen must also not be so rigid as to break while being flexed or bent. The material must also have a melting point sufficiently high to withstand the gasket molding process temperatures.

The lower compression region of the gasket can be provided with a series of circumferential engagement ribs for engaging the mating male spigot pipe end. The main gasket body has an outer bulbous region which can similarly be provided with a series of circumferential engagement ribs for engaging the female socket end of the pipe. Preferably, the main gasket body has a lower, primary sealing surface which forms a combination lip and compression seal region for the gasket. The "lip" region is separated from the convex sealing surface and trailing tail portion of the gasket body by a V-shaped recess. The V-shaped recess allows the lip region of the gasket body to bend inwardly as the mating male, spigot end of a mating pipe section encounters the primary sealing surface of the gasket.

A method is also shown for manufacturing this first version of a sealing pipe gasket designed for receipt within a bell pipe groove provided within a socket end of a female pipe member, whereby fitting the gasket within the groove allows a mating male pipe having a spigot pipe end to be inserted therein to form a continuous pipe joint. The method includes providing a mold having a first mold face with a circumferential recess. A hard plastic reinforcing element, the band, is placed within the circumferential recess in the first mold face, the hard plastic band being formed as a series of wedges interconnected by a flexible ribbon. The wedges each have a front edge, a rear edge and opposing side edges, as viewed in cross section, and wherein the opposing side edges slope evenly from the rear edges to the front edges thereof.

A second mating mold face is provided which is then united with the first mold face, with a rubber compound being injected into the mold recess. Heat and pressure are applied to the mold to form a ring shaped elastomeric body having a main body portion formed of rubber which, when viewed in cross section, includes a leading nose region, a lower compression region and a trailing tail region. The main body portion of the gasket is then cured with the hard plastic ribbon contained therein, whereby the leading nose region of the main body portion of the gasket is reinforced by the hard plastic ribbon.

The gasket of the invention, while being reinforced by the hard plastic ribbon, is nevertheless flexible enough to allow the ribbon to be bent at an oblique angle for insertion within the mating bell pipe groove provided in the female socket pipe end. The gasket then returns to a generally cylindrical shape and is secured-in within the bell socket groove by the action of the hard plastic ribbon.

In a second version of the invention, the same specially manufactured gasket is designed for use in a Rieber "belled over" pipe manufacturing process. In this version of the invention, the trailing tail region of the main body portion of the gasket is reinforced by a hard plastic band formed as a series of integral, spaced wedges interconnected by a flexible ribbon, the hard plastic band being embedded within the trailing tail region of the main body portion of the gasket during gasket manufacture. The specially manufactured gasket is then used in a traditional Rieber style pipe manufacturing process in which:

a mandrel is provided with an inner end and an outer end and having an outer working surface;

a specially manufactured gasket of the invention is installed at a first circumferential position on the outer working surface;

a backup collar is provided at a second circumferential location on the mandrel, the backup collar having an exposed lip portion which abuts the gasket at an acute angle with respect to the outer working surface of the mandrel;

a socket end of the thermoplastic pipe is then heated up to a desired temperature;

the heated socket end of the thermoplastic pipe is forced over the working surface of the mandrel and over the gasket and backup collar, whereby the heated socket end of the thermoplastic pipe flows over the gasket to form a retention groove or raceway for retaining the gasket;

the backup collar is then retracted;

the cooled heated socket end of the thermoplastic pipe is then retracted, along with the integrated sealing gasket which is retained within the internal groove or raceway of the belled pipe end, as the cooled socket end of the thermoplastic pipe and the retained gasket are retracted from the working surface of the mandrel.

In this version of the invention, the trailing tail region, rather than the leading nose region, of the main body portion of the gasket is reinforced by a hard plastic band formed as a series of integral, spaced wedges interconnected by a flexible ribbon, as previously described such that the heated and softened pipe end can be pushed over the gasket without rubber deformation. While the gasket of the invention is installed in a Rieber style "belled over" manufacturing process, it's use of an embedded hard plastic band, rather than a metal reinforcing ring, allows it to be removed from the belled pipe end, if desired.

Additional objects, features and advantages will be apparent in the written description which follows.

BRIEF DESCRIPTION OF THE DRAWINGS

FIGS. 19-22 are simplified, schematic views, similar to FIGS. 13-16, showing the steps involved in a Rieber style belling operation, using the gasket design of the invention.

DETAILED DESCRIPTION OF THE INVENTION

Figure 1:
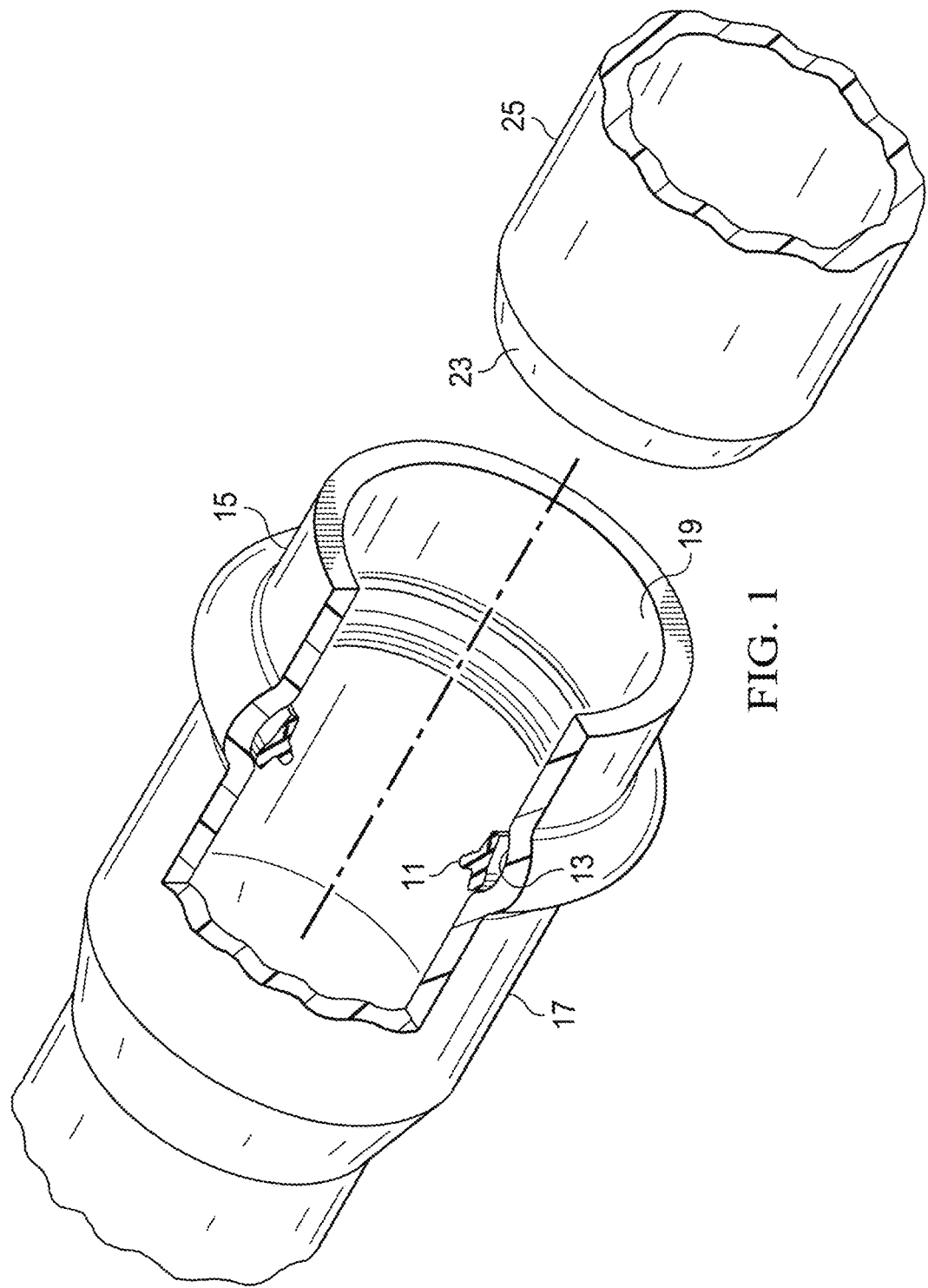
FIG. 1 is an end view of a section of plastic pipe, partly broken away, and showing the bell end and raceway, with one version of a gasket of the invention in place in the raceway, the male pipe section being position for insertion into the bell.

Turning now to the attached illustrations, FIG. 1 shows one version of the pipe sealing gasket 11 of the invention in place prior to the assembly of a pipe joint. The gasket 11 is installed within a groove or "raceway" 13 provided within the belled end 15 of a female pipe section of thermoplastic pipe 17. The female pipe section 17 can be formed of any of a variety of commercially available thermoplastic materials, such as the polyolefin family including polyethylene and polypropylene as well as polyvinyl chloride and similar materials. Thermoplastic pipes of this general type are used in a variety of industrial settings including water, sewage and chemical industries. The belled end 15 of the thermoplastic pipe section has a mouth opening 19 which is engageable with a spigot end 23 of a mating male pipe section 25 to form a pipe joint. In this version of the invention, the gasket receiving raceway 13 has been preformed in the pipe mouth opening 19 at the pipe manufacturing facility, as by using a collapsible mandrel belling tool.

Figure 2:
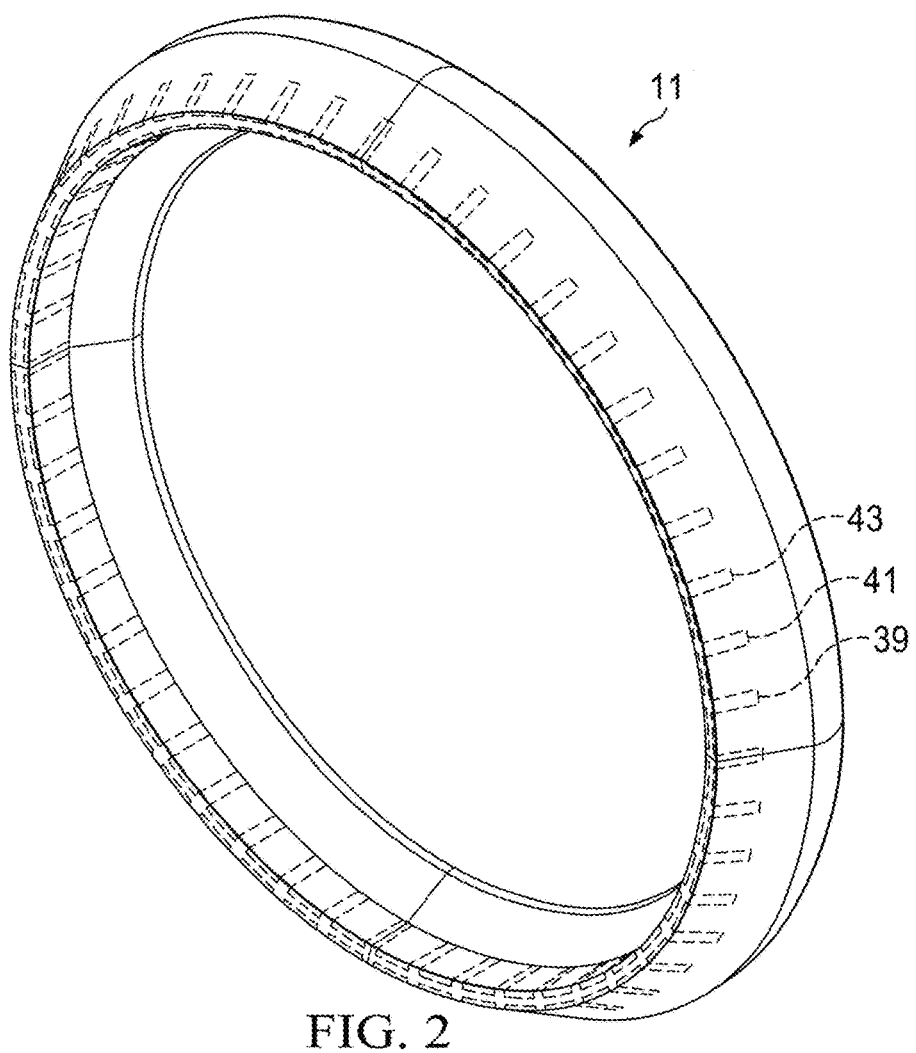
FIG. 2 is a perspective view of the sealing gasket of the invention, showing the hard plastic band with its wedges and associated flexible ribbon in dotted lines.
Figure 7:
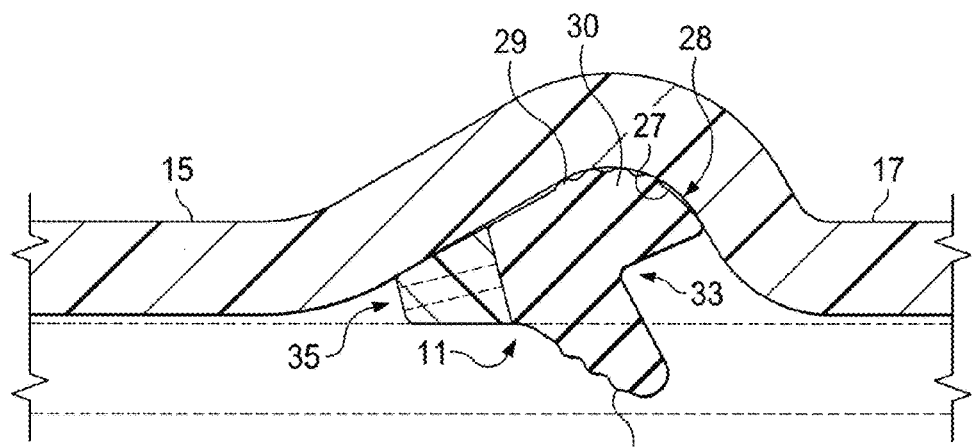
FIG. 7 is a side, partial cross sectional view of the gasket of the invention in place in the internal groove provided in the female bell socket pipe end, the direction of travel of the mating male pipe member being shown in dotted lines.

A particularly preferred form of the first version of the gasket 11 which can be used in the method of the invention is shown in profile in FIG. 2 and in cross-section in FIG. 7. Preferably, the gasket 13 is an annular, ring-shaped member having a main gasket body 28 formed of a flexible elastomeric material, such as a suitable natural or synthetic rubber. The elastomeric material used to form the body 28 of the gasket will vary in composition depending upon the end application but may encompass a number of different natural and synthetic rubbers including, for example, styrene butadiene rubber (SBR), ethylene propylene diene rubber (EPDM), acrylonitrile-butadiene rubber (NBR), nitrile rubber, etc.

Figure 10:
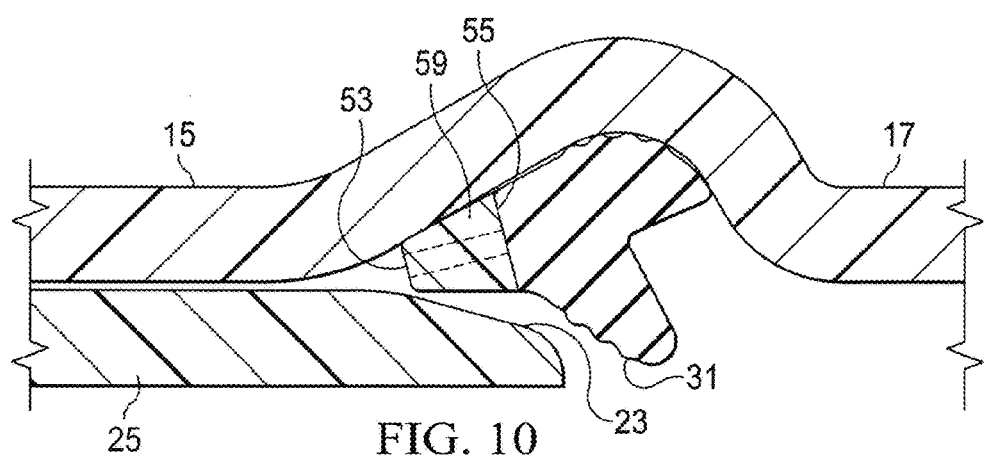
FIG. 10 shows the beginning step of the make up of a pipe joint with the male pipe end just beginning to make contact with the sealing gasket of the invention
Figure 9:
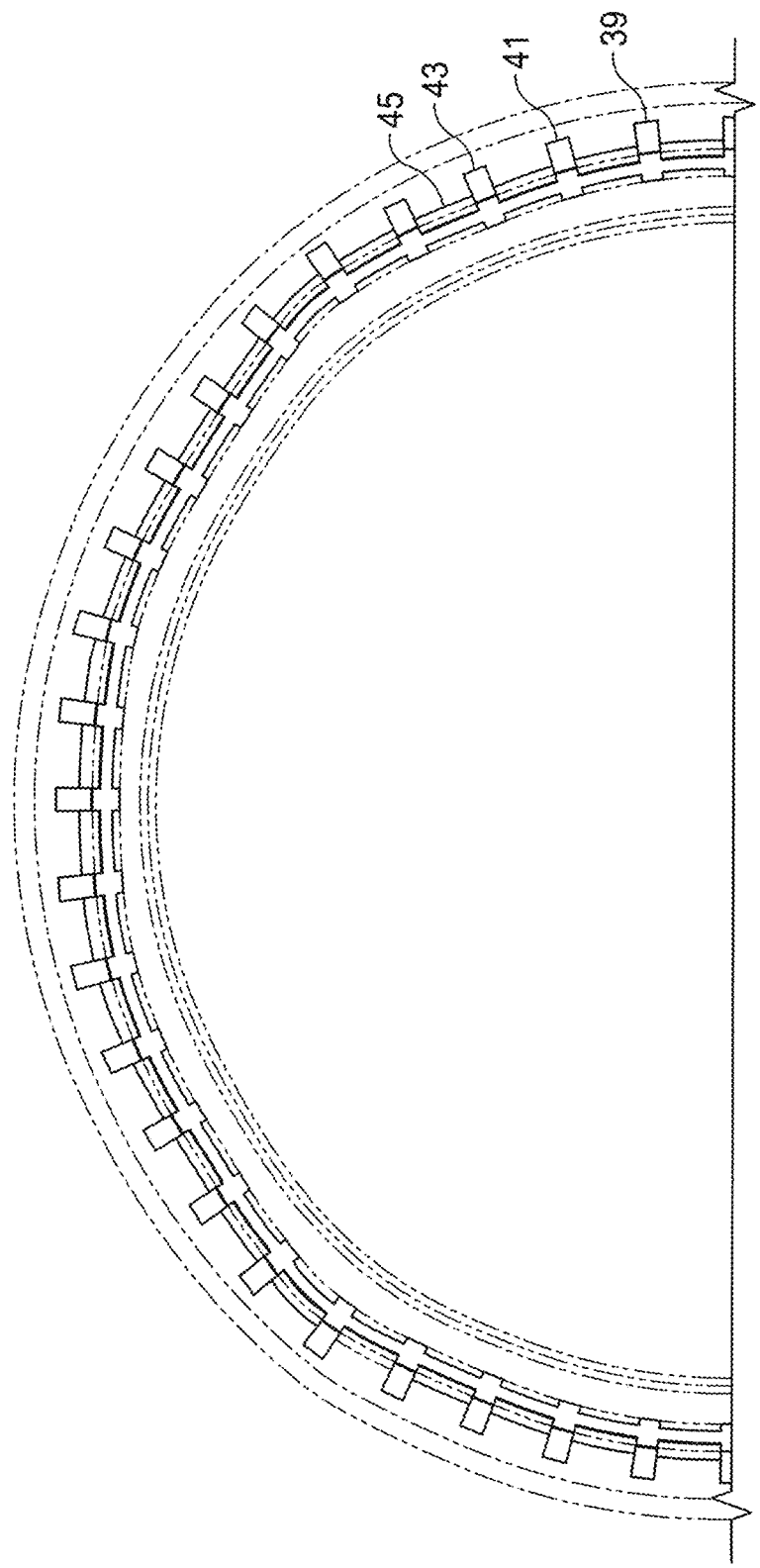
FIG. 9 is a top view of a portion of the gasket of the invention, showing the placement of the hard plastic band, the rubber portion of the gasket body being shown in phantom lines.

Turning now to FIG. 7, in this first version of the gasket of the invention, the main gasket body 28 includes an outer convex sealing surface 27 which, in this case, is provided with a series of ribs or serrations 29. The main gasket body also includes a lower, primary sealing surface 31. In the preferred embodiment shown, the primary sealing surface 31 is an evenly sloping face of the gasket body which forms a combination lip and compression seal region for the gasket. The lip region is separated from the outer convex sealing surface 27 and trailing tail portion 30 by a V-shaped recess (shown generally as 33 in FIG. 7). The V-shaped recess allows the lip region of the gasket body to bend inwardly as the mating male, spigot end of a mating pipe section encounters the primary sealing surface 31 of the gasket (see FIGS. 10-12).

Figure 8:
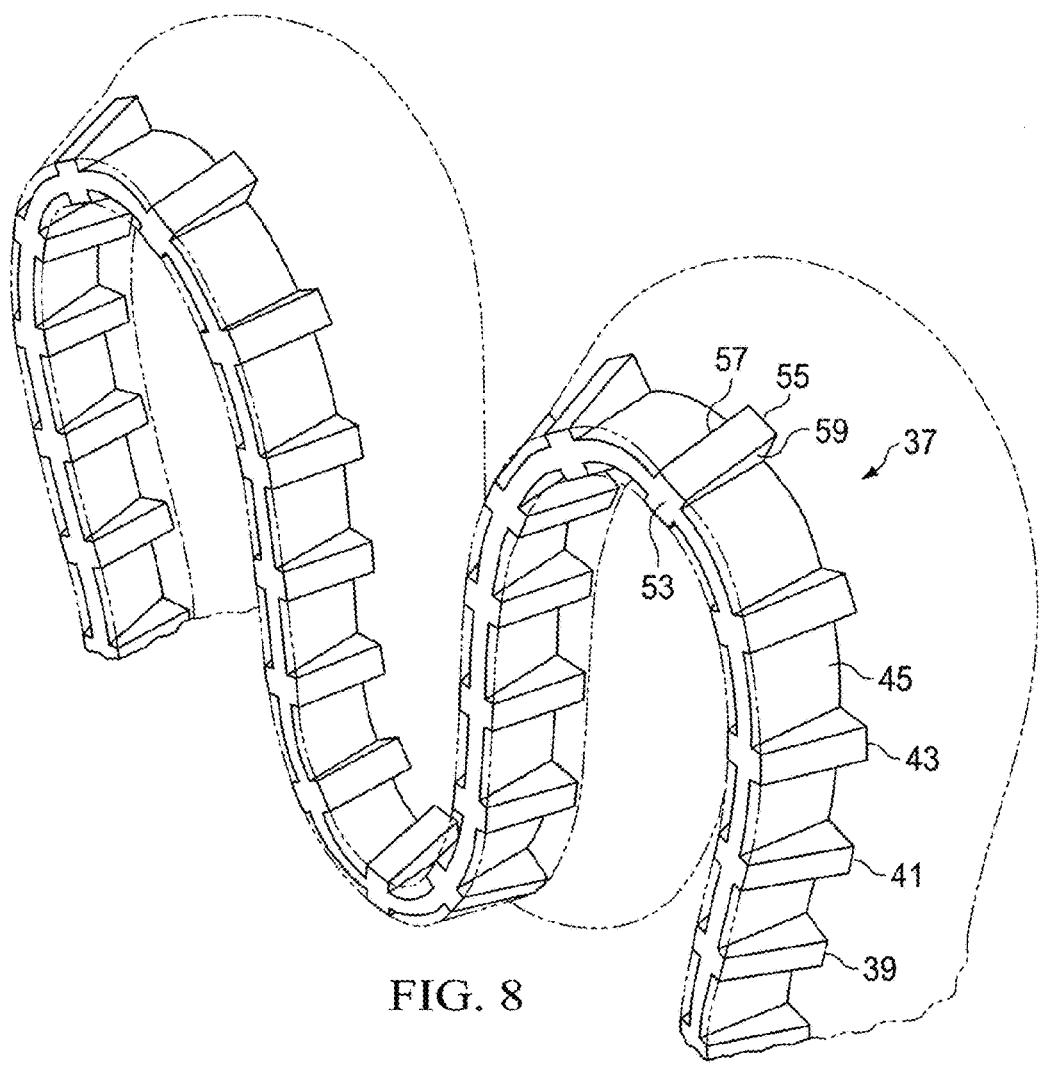
FIG. 8 is a broken away view of the hard plastic band used in the manufacture of the gasket of the invention, and illustrating the wedges which are interconnected by the flexible ribbon.

Returning to FIG. 7, the main gasket body 28 also has a leading nose region, designated generally as 35 in FIG. 7 which is initially contacted by the mating male spigot pipe end during the assembly of the pipe joint. The leading nose region 35 faces generally towards the female socket end of the pipe once the gasket is inserted within the pipe. With reference now to FIG. 8, it will be appreciated that the leading nose region of the gasket is reinforced by a hard plastic band 37 formed as a series of integral, spaced wedges (such as wedges 39, 41, 43) interconnected by a flexible ribbon 45. As will be apparent from FIGS. 4 and 8, the wedges 39 each have a front edge 53, a rear edge 55 and opposing side edges 57, 59. The opposing side edges (such as side edge 59 in FIG. 10) slope evenly from the rear edges 55 to the front edges 53 thereof, as viewed in this cross section. FIG. 2 shows the reinforcing hard plastic band with its associated wedges in phantom lines (see, e.g., wedges 39, 41, 43). The gasket body can thus be thought of as having a rubber element and as having a hard plastic element, the hard plastic element serving as the reinforcing element for the gasket body.

During the manufacture of the gasket, the hard plastic band 37 is embedded within the leading nose region of the gasket during the gasket manufacturing operation. As will be explained in greater detail, the wedges 39 on the hard plastic band 37 act to prevent extrusion of the gasket from the raceway (13 in FIG. 1) provided in the female socket end of the thermoplastic pipe once a spigot end of a mating male pipe is installed to form a pipe joint.

As was previously mentioned, the main body portion of the gasket is formed of a natural or synthetic rubber, such as a styrene butadiene rubber, ethylene propylene diene monomer rubber or nitrile rubber. The durometer of the rubber used for the main gasket body may vary depending on the end application but will typically be in the range from about 40-70 Shore A hardness, preferably about 40-60 Shore A. The hard plastic band 37, on the other hand, in this first version of the gasket of the invention is formed of a synthetic plastic material having a durometer which is greater than the durometer of the main body portion of the gasket. The synthetic plastic material used for the band is preferably a material which shows an appropriate stiffness for the application at hand while allowing flexing (accepts inverse curvature) during installation. The band can have a higher durometer than the remaining main body portion of the gasket since it does not participate in the sealing function of the gasket to the same extent as the primary sealing region of the gasket. The band must also have a melting temperature high enough to withstand the temperatures of the gasket molding process (higher than the melting point of the rubber body portion).

Various hard plastic type materials may be suitable candidates for use as the hard plastic band. These materials include such materials as polypropylene, polyvinylchloride and various "engineered plastics." For example, one such material is those hard plastics which fall into the family group of modified polyphenylene ethers (PPE). These commercially available materials have high heat resistance, making them suitable for injection or compression molding and are generally suitable for plastic/rubber composites. One commercially available family is the VESTORAN® family of materials. VESTORAN® is the registered trademark of Evonik Degussa GmbH for molding compounds containing poly-2,6-dimethyl-1,4-phenylene ether as polymeric constituent (poly-phenylene ether, PPE, also referred to as PPO).

The method of manufacturing the first version of the sealing pipe gasket of the invention will now be described. The gasket is designed for receipt within a bell pipe raceway provided within a socket end of a female bell pipe member, whereby fitting the gasket within the raceway allows a mating male pipe having a spigot pipe end to be inserted therein to form a continuous pipe joint. The manufacturing method will be described primarily with respect to FIGS.

Figure 3:
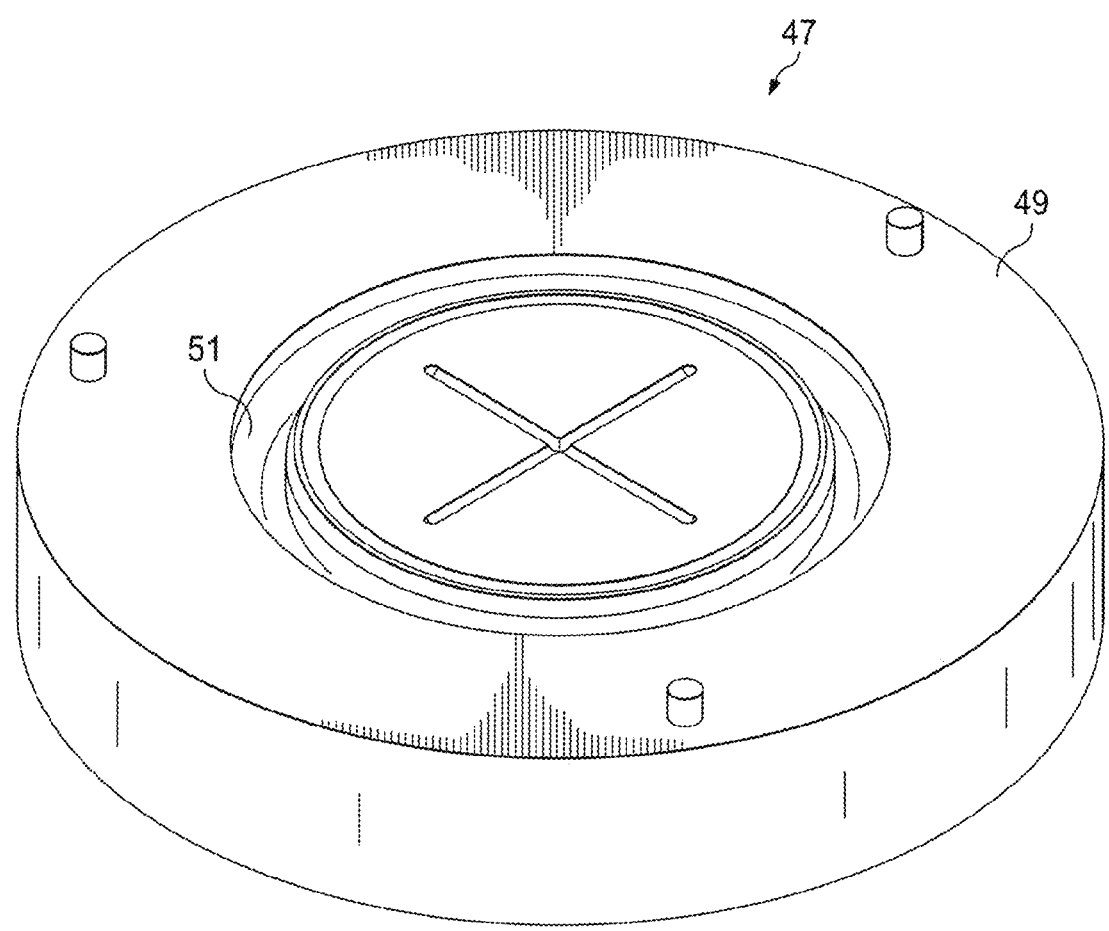
FIGS. 3-6 are simplified views of the steps of installing the hard plastic band within an associated mold, the mold thereafter being injected with rubber and heated and cured to make the completed gasket of the invention.
Figure 4:
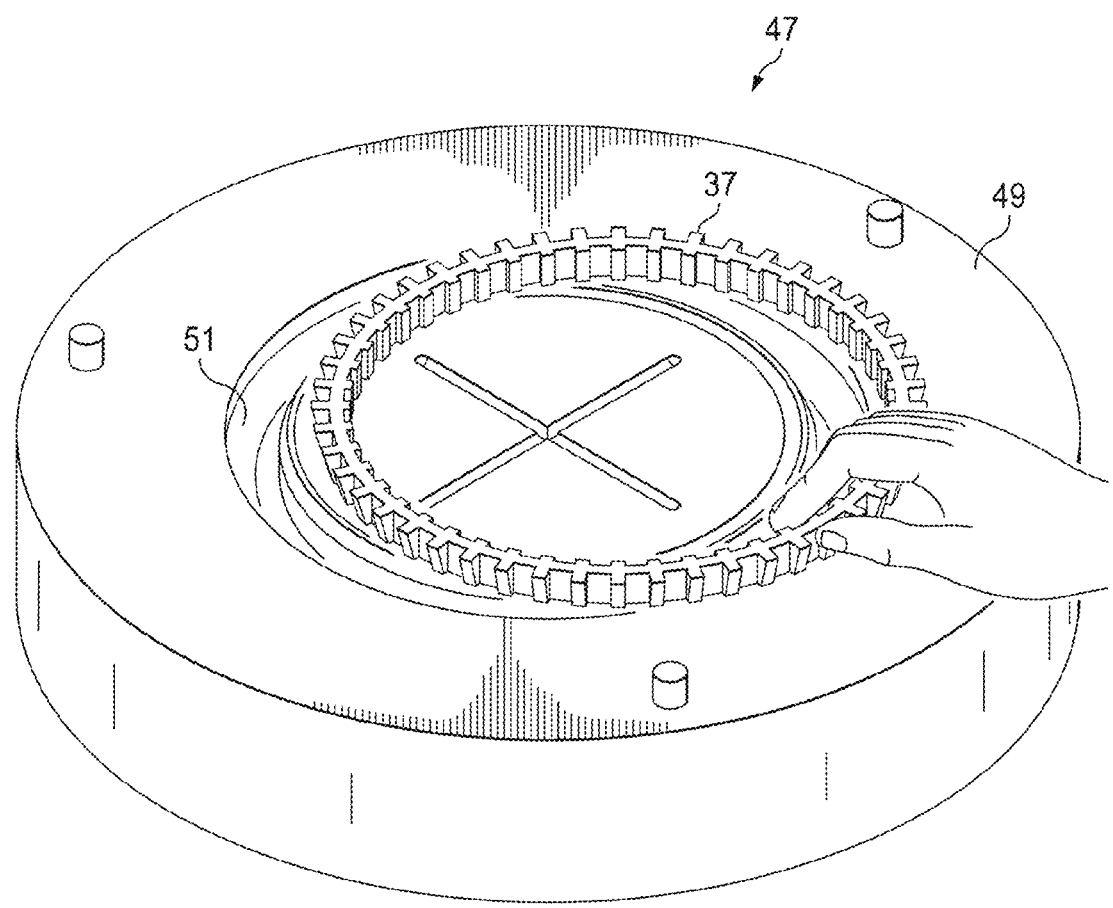

3-6. FIG. 3 shows one half of an injection molding die 47 of the type that will be familiar to those skilled in the relevant arts. As can be seen in FIG. 3, the first mold half has a first mold face 49 with a circumferential recess 51. As shown in FIG. 4, in the first step of the manufacturing process, the hard plastic band 37 with its series of integral, spaced wedges interconnected by the flexible ribbon 45 is placed within the circumferential recess 51. It should be noted that, rather than using metal pins in the mold to support a metal reinforcing band, or the like, the hard plastic band is loaded into the mold with the wedges resting on the inside surface of the mold cavity. As a result, the surfaces of the wedges are actually faintly visible in the completed gasket (see FIG. 2). It will be appreciated that placing the wedges into the mold as discrete and individual elements would be very time consuming. However, because the teeth are interconnected by the flexible ribbon, they can easily be placed in the mold integrally, in a single step. This also assures the proper spacing of the individual teeth about the circumference of the gasket.

Figure 5:
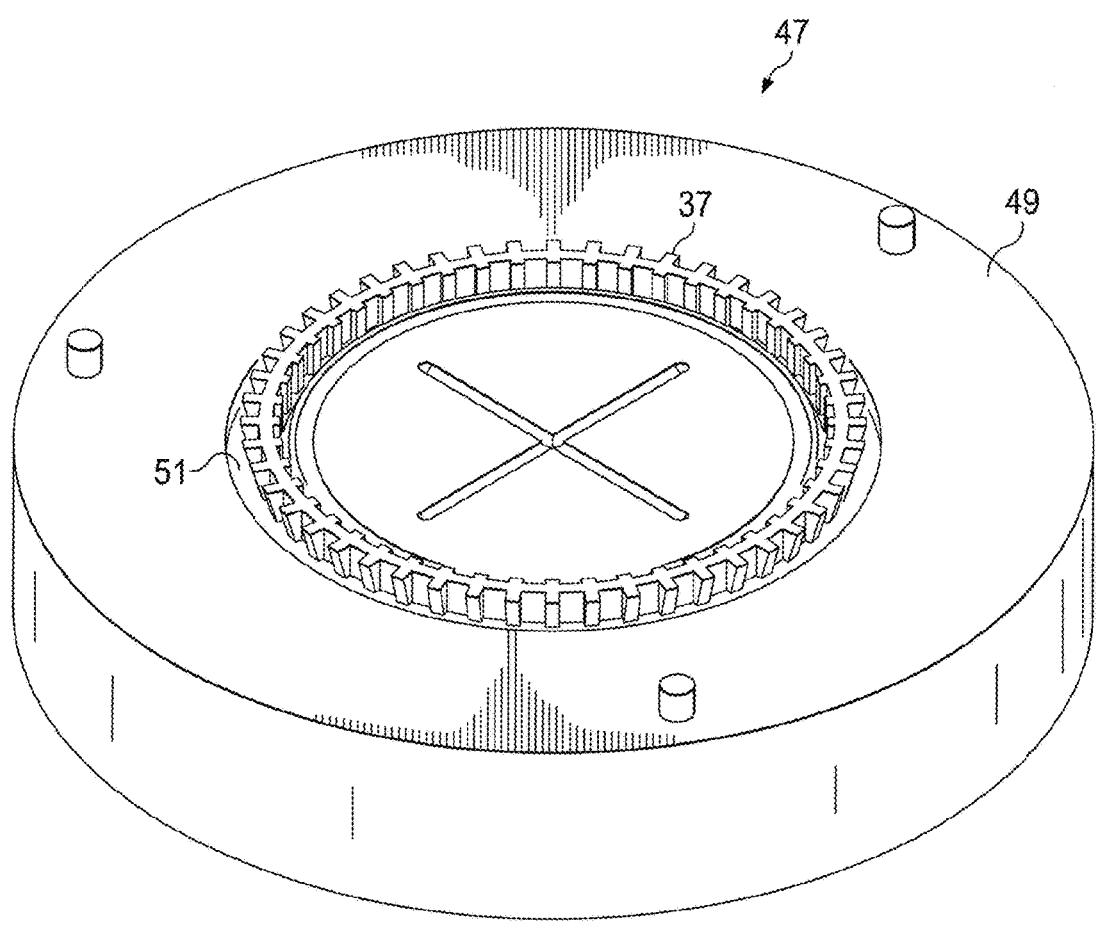
Figure 6:
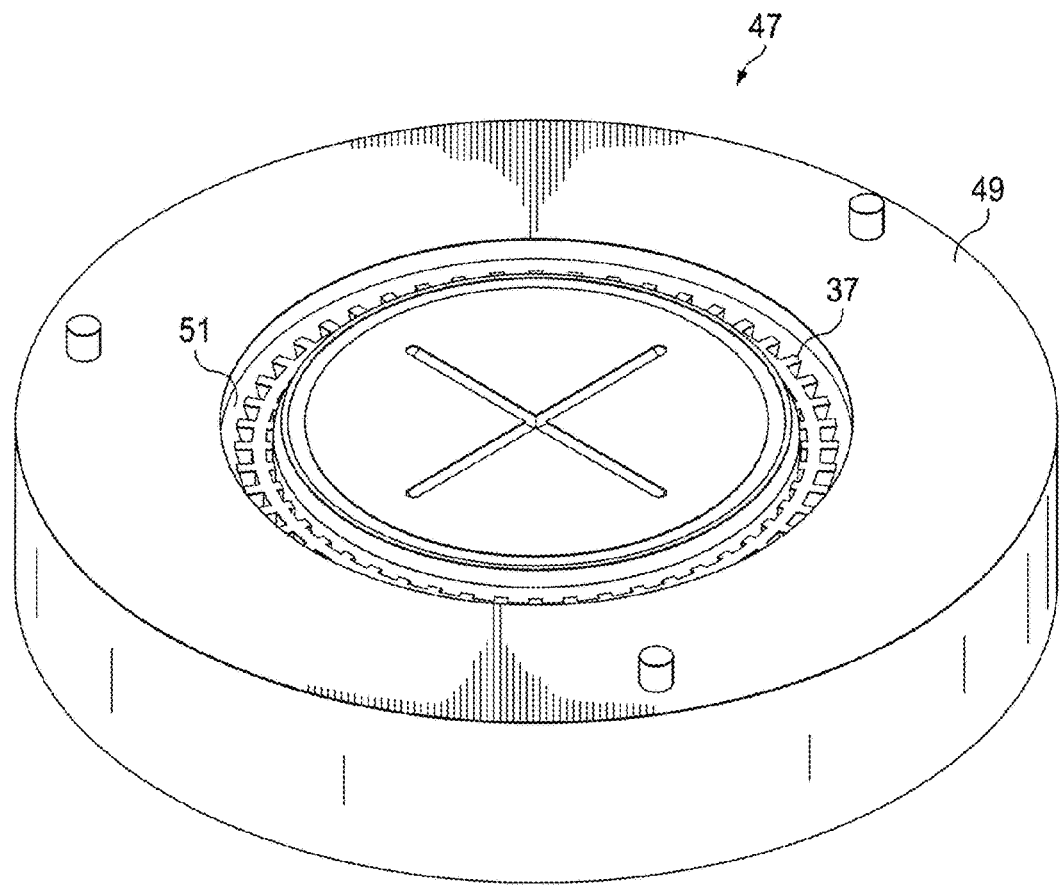

Next, there is provided a second mating mold face which is essentially a mirror image of the first mold face. FIG. 5 shows the hard plastic band partially installed in the circumferential groove of the first mold face, while FIG. 6 shows the band fully installed. The first and second mold faces are then united and the moldable rubber compound is injected into the circumferential recess. In the known manner, heat and pressure are then applied to the mold to form a ring shaped elastomeric body. The heat and pressure in the mold cures the main body portion with the hard plastic band embedded therein, whereby the main body portion of the gasket is reinforced by the hard plastic band, whereby hydraulic pressure due to fluid in the pipe acts upon the wedges on the hard plastic band to push the teeth into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid.

Figure 11:
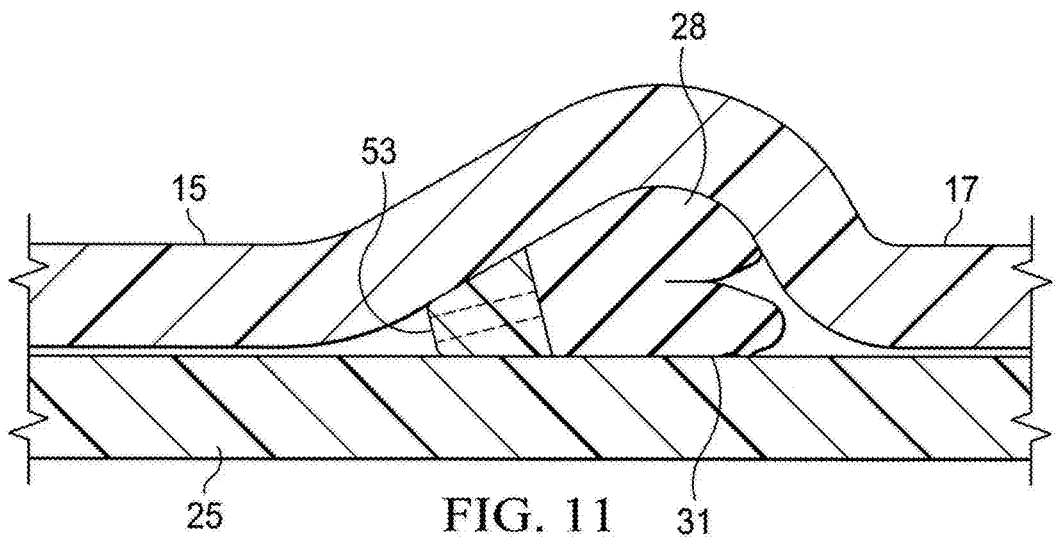
FIG. 11 is a view similar to FIG. 10, showing a completed pipe joint, with an external pressure force acting on the sealing gasket.
Figure 12:
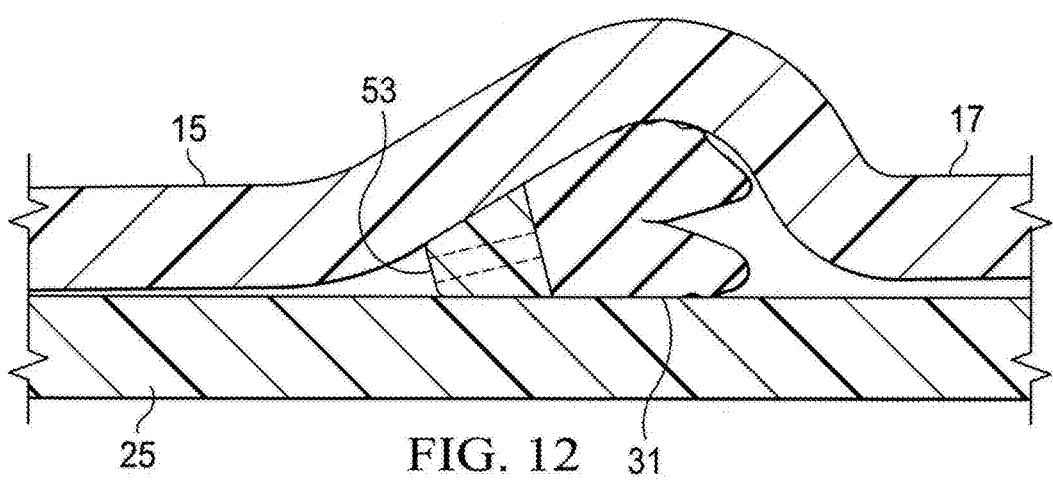
FIG. 12 is another view of the completed pipe joint, this time with the sealing gasket having an internal pressure force acting on the gasket.

While the gasket body is reinforced to prevent extrusion under various fluid pressure conditions, as well as from being displaced during field assembly, it remains flexible enough to allow the gasket to be bent by hand and installed within a gasket receiving raceway provided within the belled end of a female pipe member. The sealing gasket can be installed within the gasket receiving raceway by bending the gasket to temporarily transforms the gasket from a generally cylindrical shape to a generally elliptical shape, followed by placing the gasket within the gasket receiving groove and releasing the gasket, whereby the gasket returns to the generally cylindrical shape. Hydraulic pressure due to fluid in the pipe acts upon the wedges on the hard plastic band to push the wedges into tighter engagement with the mating male and female pipe members to prevent extrusion of the gasket from the raceway provided in the female bell socket end of the thermoplastic pipe once a spigot end of a mating male pipe is installed to form a pipe joint and the pipe is conveying fluid. FIG. 11 shows a cross section of the gasket of the invention 11 installed in a pipe joint with external pressure acting upon the gasket. FIG. 12 is a view similar to FIG. 11 but shows the cross sectional shape of the gasket where an internal fluid pressure is acting upon the gasket body.

Figure 13:
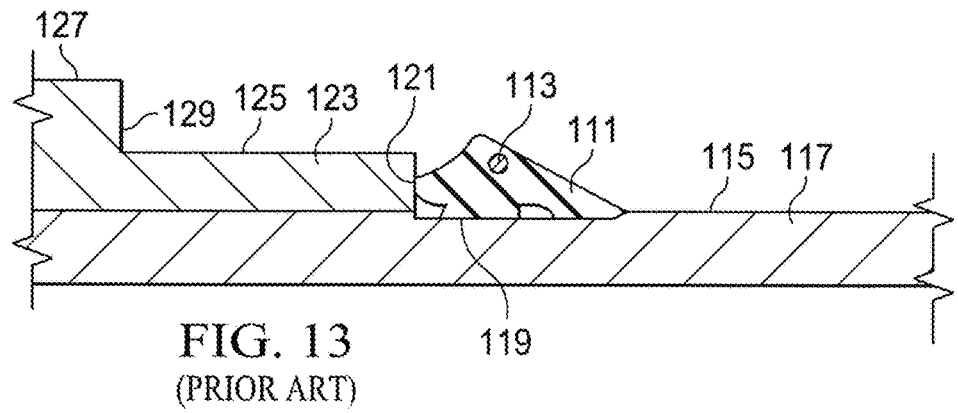
FIGS. 13-16 are simplified, schematic views showing the steps involved in the prior art Rieber style pipe belling operation.
Figure 14:
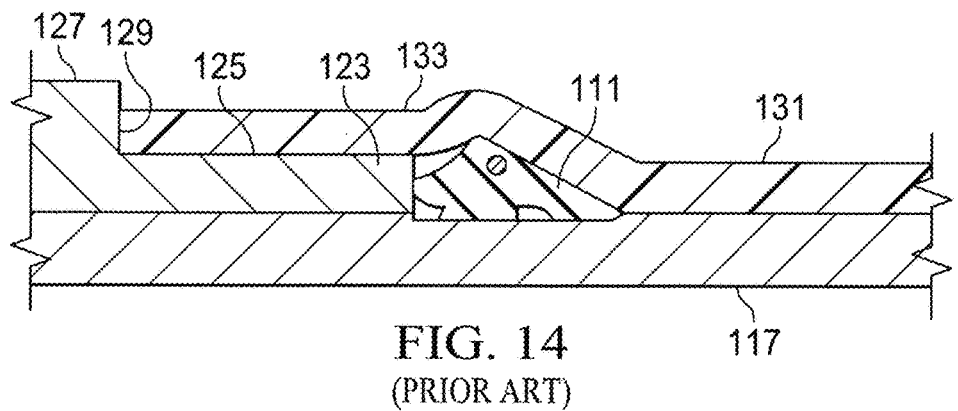
Figure 15:
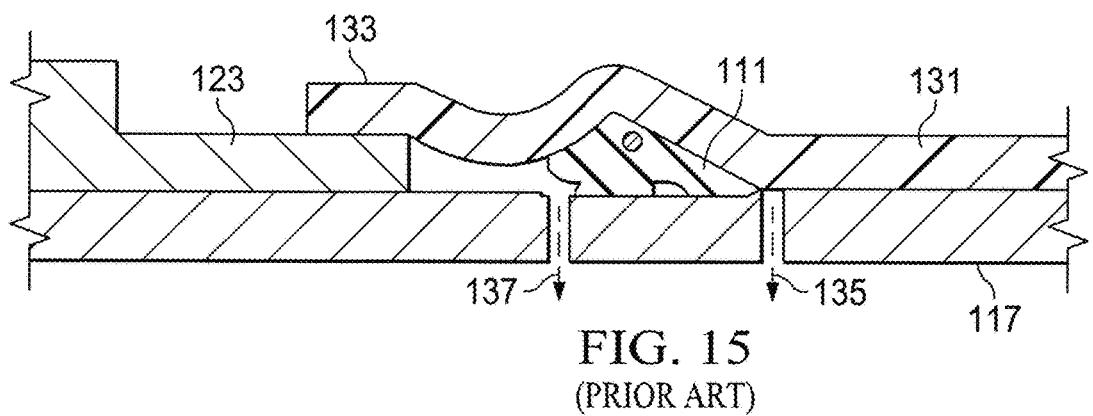
Figure 16:
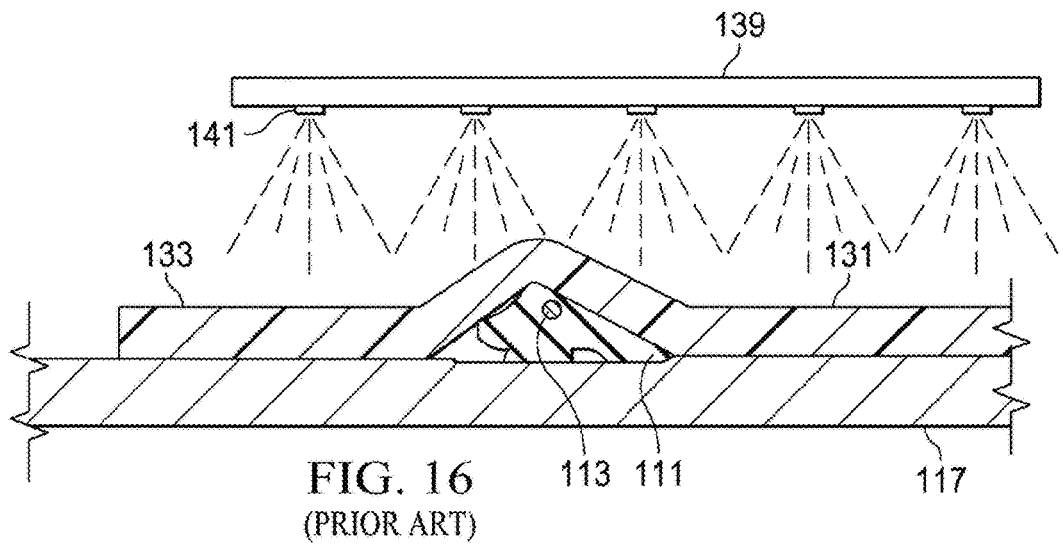

The previous discussion has been directed toward a first version of the sealing gasket of the invention which is installed in a preformed belied female plastic pipe end. As has been previously discussed, there are also situations where it is desirable to have a gasket which is a "belled over" Reiber process, rather than the pipe being preformed without any integrated gasket. FIGS. 13-16 show the prior art Reiber pipe belling process, which will be familiar to those skilled in the art. The previous references in this discussion to a "Rieber style" manufacturing process or to a "belled over" pipe belling process are intended to refer to the pipe manufacturing process illustrated in simplified fashion in FIGS. 13-16. This process will be familiar to those skilled in the relevant plastic pipe manufacturing arts. FIG. 13 shows a section of a conventional elastomeric sealing gasket 111 having a steel reinforcing ring 113 in place on the generally cylindrical outer working surface 115 of the belling mandrel 117 used in the belling process. The elastomeric gasket 111 can be formed of, for example, rubber and is a ring shaped, circumferential member having an inner compression surface 119 and an exposed nose portion 121 which, as shown in FIG. 13, abuts a forming collar 123. The nose portion 121 forms a sloped contact area for contacting the lip portion 122 of the backup collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 14. The lip portion 122 of the backup collar 123 forms a right angle with respect to the working surface 115 of the mandrel 117.

In the first step of the prior art process, the steel reinforced elastomeric ring 111 is thus placed onto the working surface of the mandrel 117 and pushed to a position against the back-up or forming collar 123. In this position, the gasket is anchored to the mandrel surface with the rubber between the mandrel and the steel ring of the gasket being compressed by approximately 20%

In the second step of the prior art process, the socket end 133 of the thermoplastic pipe 131 (FIG. 14) is heated and pushed over the steel mandrel 117, gasket 111 and back-up collar 123. The thermoplastic pipe will typically be heated in the temperature from about 82 to 92° C. prior to contacting the gasket. The socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The socket end 133 flows over the first cylindrical extent 125 of the back-up collar 123 and abuts the step region 129 in the second step of the process.

In the next step of the prior art process (FIG. 15) the mandrel and pipe move away from the back-up collar 123 and the pipe socket end 133 retracts around the mandrel and gasket 111 due to the elastic forces of the thermoplastic material. Typically, vacuum was also applied through ports 135, 137 which connected the mandrel working surface with a vacuum source (not shown).

In the final step of the prior art process (FIG. 16), the pipe socket end 133 is cooled by means of a water spray bar 139 and spray nozzles 141. As the cooling takes place, the pipe socket end 133 shrinks around the gasket 111, thus compressing the rubber body of the gasket between the steel reinforcing ring 113 and the socket-groove to establish a firm seal.

The above described Rieber process has been in commercial use since the early 1970's and is described in the above referenced issued United States patents which are discussed in the Background portion of the application, among other sources. It will thus be well familiar to those skilled in the thermoplastic pipe sealing arts.

Figure 17:
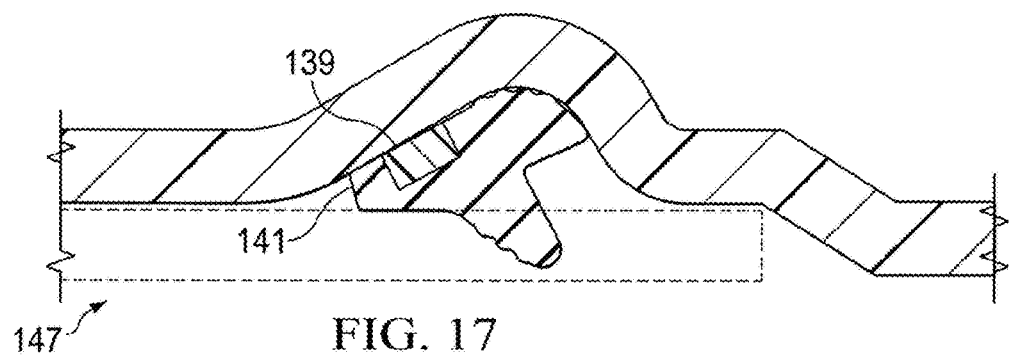
FIGS. 17 and 18 are simplified views of the first and second versions of the improved gaskets of the invention, comparing the similarities and differences thereof.
Figure 18:
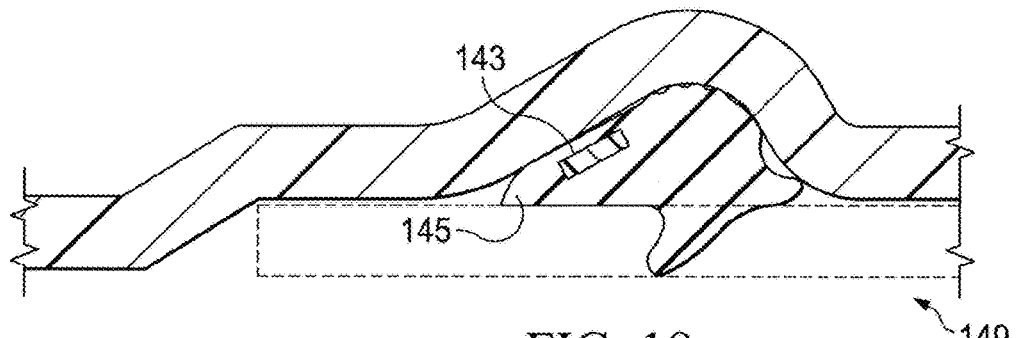
Figure 19:
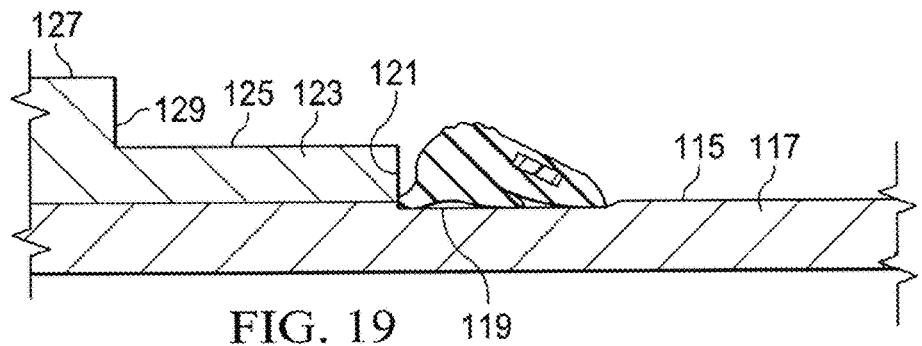
FIGS. 19-22 are similar to the simplified, schematice view of the Rieber pipe belling process shown in FIGS. 13-16, but show the new gasket of the invention installed on the forming mandrel.
Figure 20:
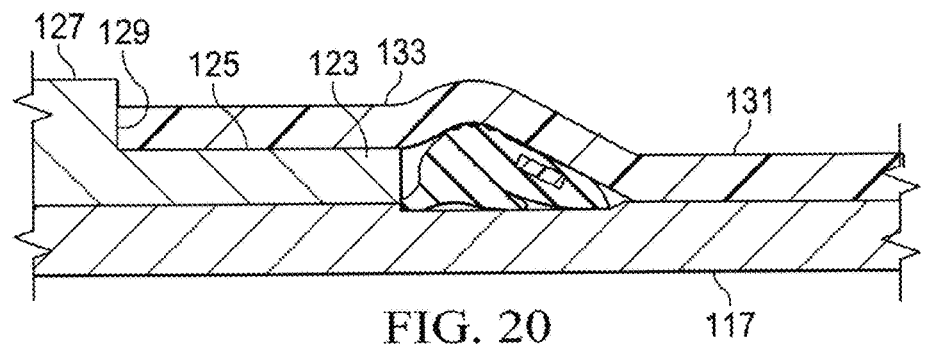
Figure 21:
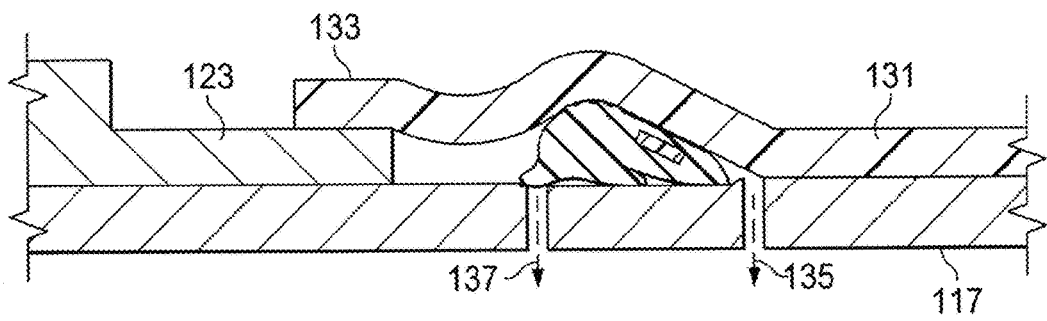
Figure 22:
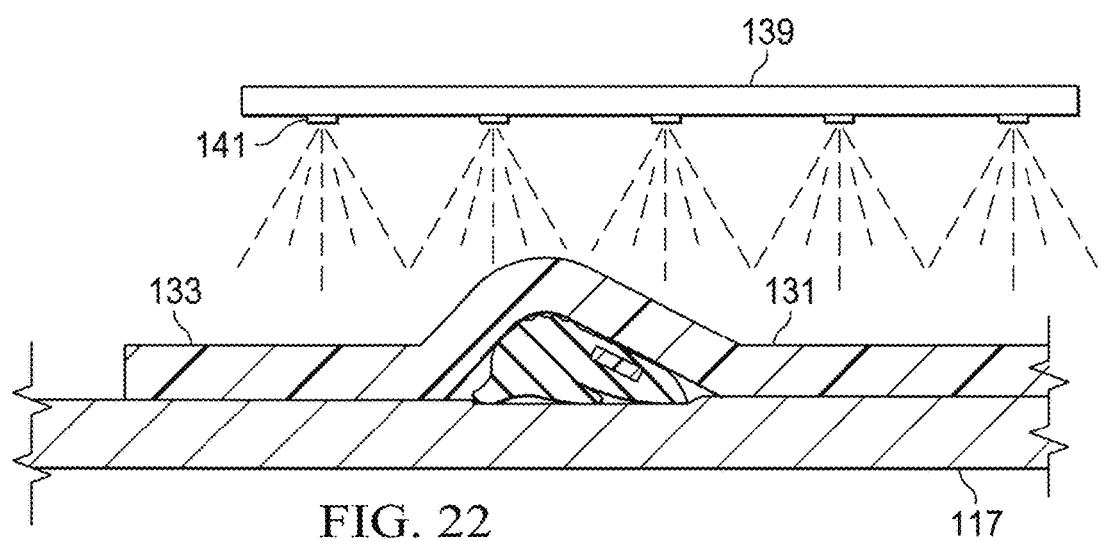

A unique aspect of the previously described sealing gasket of the invention is that it can be used, in generally similar forms, in either a preformed gasket raceway in the female belled pipe end where it is installed by hand, or in a "belled over" Rieber pipe manufacturing process, where the hot pipe end is belled over the gasket. However, unlike the previous Rieber style manufacturing processes, the present gasket has sufficient stiffness to prevent deformation of the trailing tail portion, hence withstand the Rieber manufacturing process, while still being subsequently removable by hand from the belled pipe end raceway. FIGS. 17 and 18 show the basic differences in the two versions of the gasket of the invention. FIG. 17 shows the first version of the gasket (previously described) in which the hard plastic band 139 is used to reinforce the leading nose region 141 of the gasket body, while in FIG. 18, the hard plastic band 143 reinforces the trailing tail portion 145 of the gasket body. In either case, the hard plastic band with its wedge elements spaced along the flexible ribbon is embedded within the relatively softer durometer rubber of the main gasket body. FIGS. 19-22 show one version of the new gasket in place on the forming mandrel and undergoing the previously described Rieber belling process. The respective bell socket mouth openings of the plastic pipes are illustrated generally at 147 and 149 in FIGS. 17 and 18.

In the case of the first version of the invention shown in FIG. 17, the hard plastic band must be a high temperature plastic which can withstand the molding temperatures of the gasket molding process and yet be flexible enough to assume the inverse curvature orientation to allow it to be installed in a preformed raceway. In the case of the second version of the invention the hard plastic band of the preferred embodiment has the same physical characteristics such that it can be removed subsequent to the "belled over" Rieber process shown in FIG. 18. However, the hard plastic band could be a thermoset plastic, such as a phenolic. The material of the hard plastic band must supply the requisite stiffness trailing tail region of the gasket to allow belling over in a Rieber pipe belling operation. The outer diameter and thickness of the hard plastic band will be selected, along with the choice of synthetic plastic material, to provide the desired requisite stiffness of the hard plastic band.

The outer configuration of the second version of the gasket can assume various shapes, generally any of the sealing shapes known in the art. One acceptable shape, for example, is a combination lip and compression seal such as the gasket shown in U.S. Pat. No. 7,441,319, entitled "Snap Fit Sealing Gasket With Precisely Located Internal Retainer Ring for Triangular Pipe Grooves", assigned to the assignee of the present invention.

An invention has been provided with several advantages. In a first version of the gasket of the invention, the method for installing a gasket allows a pipe gasket to be installed within a preexisting and preformed groove in a thermoplastic pipe, as most commonly found for PVC-O. Once the gasket has been secured in position in snap-fit fashion, it is securely retained within the pipe raceway and resists axial forces tending to displace the gasket from the raceway. Because a gasket is inserted within a preformed pipe groove or raceway, the manufacturing and installation processes are simplified and made less costly. The design of the gasket also makes it possible to remove one gasket and reinstall another within a preformed raceway in the selected pipe end. The gasket which is utilized in the process is simple in design and relatively economical to manufacture. There is no need for an external retaining band or a treated and coated internal metal ring to assist in securing the gasket within the pipe groove. Because the wedges, spaced around the plastic band, sit in contact with the mold face during manufacture of the gasket, it is also possible to eliminate the pins necessary in prior art. The hard plastic band with its integral, spaced wedges acts to prevent extrusion of the gasket from the female pipe groove under a variety of fluid pressure situations, or from being displaced during field assembly. Providing the wedges as an integral part of a continuous ribbon simplifies the manufacturing process and saves time.

The second version of the invention provides advantages in selected circumstances. For example, the current art requires that a pipe be produced with the specific rubber gasket. Even though it is formed in a Rieber "belled over" style pipe manufacturing process, the second version of the gasket of the invention can be removed from the bell raceway and replaced with another rubber, for example nitrile. The prior art Rieber manufacturing process necessarily requires a pipe company to hold inventory to make a production run of gasketed pipe. Without prior art Rieber gaskets on-hand, pipe cannot be produced. The second version of the gasket of the invention can be placed on a belling mandrel, used as a raceway forming device, make a bell and raceway, and then removed from inside the bell. The gasket can then be placed on the belling mandrel again. Pipe can be produced and sent into inventory and gaskets installed into the bell raceways at a later date.

In the prior art Rieber manufacturing process, a wire or band is embedded in the rubber to hold the gasket dimensions and make Rieber belling possible. The wire/band is held in place with pins. As gaskets are designed having very small cross sections a wire is used, and the wire itself is very small in cross section. It becomes difficult to hold the wire in position and the little pins become susceptible to damage. The second version of the gasket of the invention is designed for use in a manufacturing process where molding die pins are not used. The elimination of the mold pins reduces mold maintenance cost and allows for production of Rieber belling of reduced cross sections not previously possible.

While the invention has been shown in only two of its forms, it is not thus limited but is susceptible to various changes and modifications without departing from the spirit thereof.

What is claimed is:

1. A method of installing a gasket with an embedded reinforcing hard plastic band within a gasket receiving raceway provided within the belled end of a female pipe member in a Rieber style pipe belling operation, the belled end having a mouth opening which is engageable with a spigot end of a mating male plastic pipe section to form a pipe joint, the method comprising the steps of:

providing a mandrel with an inner end and an outer end and having an outer working surface;

installing the gasket at a first circumferential position on the outer working surface;

providing a backup collar at a second circumferential location on the outer working surface of the mandrel, the backup collar having an exposed circumferential lip portion which abuts the gasket when the gasket is installed on the outer working surface of the mandrel;

heating a socket end of the thermoplastic pipe;

forcing the heated socket end of the thermoplastic pipe over the working surface of the mandrel and over the gasket and backup collar, whereby the heated socket end of the thermoplastic pipe flows over the gasket to form a retention groove for retaining the gasket;

retracting the backup collar;

cooling the heated socket end of the thermoplastic pipe;

retracting the cooled socket end of the thermoplastic pipe and the retained gasket from the working surface of the mandrel;

wherein the gasket is formed as a ring shaped elastomeric body having a main body portion formed of rubber which, when viewed in cross section, includes a leading nose region, a lower primary sealing surface and a trailing tail region, the leading nose region facing generally towards the female socket end of the pipe once the gasket is inserted within the pipe;

wherein the trailing tail region of the main body portion of the gasket is reinforced by the hard plastic hand formed as a series of integral, spaced wedges interconnected by a flexible ribbon, the wedges each having a front edge, a rear edge and opposing side edges, the and plastic band being embedded within the trailing tail region of the main body portion of the gasket during gasket manufacture by molding the same therein, whereby only a portion of the front edges of the hard plastic band are exposed from the main body portion of the gasket;

wherein the location of the hard plastic band in the trailing tail region of the main body portion of the gasket acts to hold the gasket body onto the working surface of the mandrel as the heated socket end of the pipe is forced over the gasket and the backup collar;

wherein hydraulic pressure due to fluid in the pipe acts upon the band on the hard plastic band to push the wedges into tighter engagement with the mating male and female pipe members to prevent extrusion of the gasket from the raceway provided in the female socket end of the thermoplastic pipe once a spigot end of a mating male pipe is installed to form a pipe joint and the pipe is conveying fluid; and wherein the material selected for the hard plastic band is an engineered plastic material which has a melting temperature high enough to withstand a gasket molding process, has sufficient stiffness to tolerate the described pipe belling process, while also being sufficiently flexible to accept inverse curvature when flexed by hand and allow the gasket to be subsequently removed by hand from the retention groove of the belled pipe end after the manufacturing process is complete.

2. The method of claim 1, further comprising the step of:
applying a vacuum to the heated, socket end of the thermoplastic pipe after the pipe has been forced over the working surface of the gasket and mandrel to thereby three the heated, socket end to contract about the mandrel and gasket.

3. The method of claim 2, wherein the heated thermoplastic pipe is cooled by a water spray after the mandrel is retracted.

4. The method of claim 2, wherein the thermoplastic pipe is heated in the temperature range from about 82 to 92° C. prior to contacting the gasket.

5. The method of claim 1, wherein the material selected for the hard plastic band is a modified polyphenylene ether.

* * * * *